(12) United States Patent
Yamaji et al.

(10) Patent No.: US 9,471,209 B2
(45) Date of Patent: Oct. 18, 2016

(54) LAYOUT EDITING DEVICE, LAYOUT EDITING METHOD AND RECORDING MEDIUM

(71) Applicant: FUJIFILM CORPORATION, Tokyo (JP)

(72) Inventors: Kei Yamaji, Tokyo (JP); Teruyoshi Nakashima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 288 days.

(21) Appl. No.: 14/205,396

(22) Filed: Mar. 12, 2014

(65) Prior Publication Data

US 2014/0281965 A1 Sep. 18, 2014

(30) Foreign Application Priority Data

Mar. 13, 2013 (JP) .................................. 2013-050651
Dec. 10, 2013 (JP) .................................. 2013-254814

(51) Int. Cl.
| | |
|---|---|
| *G06K 9/60* | (2006.01) |
| *G06F 3/0484* | (2013.01) |
| *G06T 11/60* | (2006.01) |
| *G06F 3/0481* | (2013.01) |
| *G06F 3/0482* | (2013.01) |
| *G06F 17/30* | (2006.01) |

(52) U.S. Cl.
CPC ......... *G06F 3/04845* (2013.01); *G06F 3/0482* (2013.01); *G06F 3/04817* (2013.01); *G06F 3/04842* (2013.01); *G06F 17/30* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 7,668,399 B2 * | 2/2010 | Sawano ................ | G06T 11/60 382/162 |
| 8,660,378 B2 | 2/2014 | Yabu et al. | |
| 8,903,200 B2 | 12/2014 | Yamaji et al. | |
| 2008/0205789 A1 * | 8/2008 | Ten Kate ............... | G06T 11/60 382/284 |

(Continued)

FOREIGN PATENT DOCUMENTS

| | | |
|---|---|---|
| JP | 10232917 | 9/1998 |
| JP | 2009223764 | 10/2009 |

(Continued)

OTHER PUBLICATIONS

Machine Translation of JP02009223764A, Published Oct. 1, 2009, G06T11/60, 11 pages total.*

(Continued)

*Primary Examiner* — Brian P Werner
(74) *Attorney, Agent, or Firm* — Young & Thompson

(57) ABSTRACT

Provided is a layout editing device, a layout editing method, and a recording medium. The layout editing device includes a layout editing unit editing a layout, which is displayed on an editing screen of a screen display unit, based on the instruction of a user, an image analysis unit performing image analysis of each of a plurality of images, a preference estimation unit estimating the preference of the user based on the layout editing result and the image analysis result, an image evaluation unit calculating the evaluation value of each of the plurality of images based on the preference of the user and the image analysis result, and an edit assisting unit displaying assist information, which is for assisting the editing work of the layout by the user, on the editing screen of the screen display unit based on the evaluation value of each of the plurality of images.

19 Claims, 7 Drawing Sheets

(56) References Cited

U.S. PATENT DOCUMENTS

2009/0287996 A1* 11/2009 Norimatsu .............. G06T 11/00
715/243
2013/0028521 A1 1/2013 Yabu

FOREIGN PATENT DOCUMENTS

| JP | 2009223764 A * | 10/2009 | ............. G06T 11/60 |
|---|---|---|---|
| JP | 2009-265886 | 11/2009 | |
| JP | 2009301325 | 12/2009 | |
| JP | 2012053889 | 3/2012 | |
| JP | 2013033453 | 2/2013 | |

OTHER PUBLICATIONS

Japanese Office Action, dated Feb. 3, 2015, in corresponding Japanese Patent Application No. 2013-254814.
Extended European search report, dated May 11, 2015, in corresponding European Patent Application No. 14158127.2.

* cited by examiner

LAYOUT EDITING DEVICE, LAYOUT EDITING METHOD AND RECORDING MEDIUM

BACKGROUND OF THE INVENTION

1. Field of the Invention

The present invention relates to a layout editing device, a layout editing method, and a recording medium recorded with a program to edit a layout in which a predetermined number of images selected from a plurality of images are disposed at predetermined positions.

2. Description of the Related Art

For a photo book, a user selects a predetermined number of images from a plurality of images (image data) that the user owns, and creates a photo collection (photo album) of the layout that the user desires using the selected predetermined number of images. In recent years, an automatic layout function to automatically select a predetermined number of images from a plurality of images owned by the user and automatically create the layout of each page of a photo book using the predetermined number of selected images is provided.

In a known photo book, creating a photo book from about several hundreds of images taken in one event, such as a trip or a wedding ceremony, is assumed. Meanwhile, in recent years, creating a photo book from a large number of images of 1000 to several thousands of images in a year has been performed, for example, as a memorial album for a user who owns a large number of images but has no time to create a photo book.

When laying out a photo book without using the automatic layout function, for example, a selection assisting function, such as presenting a recommended image by performing image analysis, is provided. However, when creating the layout of the photo book from a large number of images of 1000 to several thousands of images, there is a problem in that it takes a lot of time and effort for the user to select desired images from them.

On the other hand, when the automatic layout function is used, the user performs editing processing, such as the addition or deletion of an image, in the layout created automatically. However, for example, even when 200 images are automatically selected from 1500 images and the layout of the photo book is automatically created, the user should add and delete images while checking the unused 1300 images that have not been used in the photo book. Accordingly, there is a problem in that it takes a lot of time and effort.

As a prior art document relevant to the present invention, there is JP2009-265886A.

JP2009-265886A discloses an image management device that provides images to information processing apparatuses of a plurality of viewers through a network. The image management device includes setting means for setting the behavior pattern of each viewer with respect to an image, search means for searching for an image in which the operation pattern set for each viewer by the setting means matches the operation history of the viewer with respect to the provided image, and display means for displaying the image searched for by the search means.

SUMMARY OF THE INVENTION

The image management device disclosed in JP2009-265886A selects images based on the behavior pattern of the viewer with respect to images, and displays preferred images of the viewer selectively. In contrast, the present invention is for estimating the preference of a user based on a layout editing result of the user and assisting the layout editing work of the user based on the estimated user preference. Accordingly, there is a difference in that the work of editing the layout of a photo book can be simplified.

In order to solve the problems in the related art, it is an object of the present invention to provide a layout editing device, a layout editing method, and a program allowing a user to select desired unused images easily from a large number of unused images when editing the layout of images.

In order to achieve the above-described object, according to an aspect of the present invention, there is provided a layout editing device that edits a layout in which a predetermined number of images selected from a plurality of images are disposed at predetermined positions. The layout editing device includes: a screen display unit that displays an editing screen of the layout; an instruction input unit that inputs an instruction of a user for editing the layout; a layout editing unit that edits the layout, which is displayed on the editing screen of the screen display unit, based on the instruction of the user; an image analysis unit that performs image analysis of each of the plurality of images; a preference estimation unit that estimates a preference of the user based on an editing result of the layout and a result of the image analysis; an image evaluation unit that calculates an evaluation value of each of the plurality of images based on the preference of the user and the image analysis result; and an edit assisting unit that displays assist information, which is for assisting an editing work of the layout by the user, on the editing screen of the screen display unit based on the evaluation value of each of the plurality of images.

Preferably, the preference estimation unit calculates importance of each person, as the preference of the user, based on a difference between the number of appearances of each person photographed in one or more added images, which are added to the layout based on the instruction of the user from unused images that have not been used in the layout among the plurality of images, and the number of appearances of the same person as each person photographed in one or more deleted images that have been deleted from the layout based on the instruction of the user.

Preferably, the preference estimation unit weights the importance according to a size of a face of each person photographed in each of the added image and the deleted image.

Preferably, the preference estimation unit calculates the importance of each person, as the preference of the user, based on the number of appearances of each person photographed in edited images used in the layout.

Preferably, the preference estimation unit calculates the importance based on the importance of each person such that importance of a person having a large number of appearances in images in which a person of high importance is photographed, among persons photographed in images in which the person of high importance rather than a person of low importance is photographed, is higher than importance of a person having a small number of appearances in the images in which the person of high importance is photographed.

Preferably, the preference estimation unit calculates the importance based on the importance of each person such that importance of a person having a large number of appearances in images photographed on a photographing date of an image in which a person of high importance is photographed, among persons photographed in the images photographed on the photographing date of the image in which the person of high importance rather than a person of low importance is photographed, is higher than importance of a person having a small number of appearances in the images photographed on the photographing date of the image in which the person of high importance is photographed.

Preferably, the preference estimation unit calculates the importance based on the importance of each person such that importance of a person having a large number of appearance dates of photographing dates of images in which a person of high importance is photographed, among persons photographed in images photographed on the photographing dates of the images in which the person of high importance rather than a person of low importance is photographed, is higher than importance of a person having a small number of appearance dates.

Preferably, the preference estimation unit calculates the importance of each person, as the preference of the user, based on image content photographed in each edited image used in the layout.

Preferably, when an edited image used in the layout is exchanged with an unused image that has not been used in the layout of the plurality of images based on the instruction of the user, the preference estimation unit calculates importance of persons photographed in images before and after the exchange and importance of scenes and composition of the images before and after the exchange, as the preference of the user, based on whether or not a face of a person is photographed in the images before and after the exchange, whether or not the same person is photographed in the images before and after the exchange, and whether or not the images before and after the exchange are similar images.

Preferably, when an edited image used in the layout is exchanged with an unused image that has not been used in the layout of the plurality of images based on the instruction of the user, the preference estimation unit estimates the preference of the user based on any of photographing times of images before and after exchange, photographing locations of the images before and after the exchange, sizes of faces of persons photographed in the images before and after the exchange, positions of the faces of the persons photographed in the images before and after the exchange, directions of the faces of the persons photographed in the images before and after the exchange, expressions of the persons photographed in the images before and after the exchange, scenes of the images before and after the exchange, colors of entire images before and after the exchange, and whether the images before and after the exchange are landscapes or portraits.

Preferably, when only a region including a predetermined person is extracted from an image, in which two or more persons are photographed, of edited images used in the layout and is disposed in the layout based on the instruction of the user, the preference estimation unit calculates the importance such that importance of the predetermined person is higher than importance of a person other than the predetermined person out of two or more persons photographed in the image.

Preferably, the screen display unit further displays a list of a predetermined number of unused images, among unused images of the plurality of images that are not disposed in the layout, on the editing screen, and the edit assisting unit displays an unused image having a high evaluation value in preference to an unused image having a low evaluation value, as the assist information, in the list of unused images.

Preferably, the edit assisting unit places and displays the unused image having the high evaluation value at a head side of the list of unused images in preference to the unused image having the low evaluation value.

Preferably, the edit assisting unit displays the unused image having the high evaluation value distinctively in the list of unused images.

Preferably, the edit assisting unit performs the distinctive display in the list of unused images by marking the unused image having the high evaluation value, or by changing a color of a display frame of the unused image having the high evaluation value, or by changing a display size of the unused image having the high evaluation value.

Preferably, the edit assisting unit changes the predetermined number of unused images according to predetermined images, which are designated based on the instruction of the user among edited images used in the layout, and displays the result in the list of unused images.

Preferably, the preference estimation unit calculates, as the preference of the user, importance of each person or each location photographed in each of the plurality of images.

Preferably, when an image in which a person of low importance or a location of low importance is photographed, among edited images used in the layout, is designated based on the instruction of the user, the edit assisting unit displays an unused image in which a person of high importance or a location of high importance is photographed in the list of unused images in precedence to the image in which the person of low importance or the location of low importance is photographed.

It is preferable to further include an automatic layout unit that creates the layout automatically based on the preference of the user. Preferably, the edit assisting unit further displays the layout created by the automatic layout unit, as the assist information, on the editing screen of the screen display unit.

Preferably, the edit assisting unit displays at least one of a background mount, a frame decoration, clip art, and fonts for text input on the editing screen of the screen display unit, as the assist information, based on the preference of the user.

It is preferable to further include an automatic layout unit that creates a layout of each of a plurality of pages automatically. Preferably, the automatic layout unit creates a layout of a page other than a predetermined page of the plurality of pages based on an editing result of a layout of the predetermined page.

Preferably, the preference estimation unit estimates the preference of the user based on a layout editing result in two or more of a plurality of pages.

Preferably, the preference estimation unit estimates the preference of the user based on a layout editing time in each of a plurality of pages.

It is preferable to include a preference storage unit that stores data of the preference of the user. Preferably, the image evaluation unit calculates the evaluation value of each of the plurality of images based on the data of the preference of the user stored in the preference storage unit.

In addition, according to another aspect of the present invention, there is provided a layout editing method of editing a layout in which a predetermined number of images selected from a plurality of images are disposed at predetermined positions. The layout editing method includes: a step of editing a layout, which is displayed on an editing screen of a screen display unit, based on an instruction of a user for editing the layout that is input through an instruction input unit; a step of performing image analysis of each of the plurality of images; a step of estimating a preference of the user based on an editing result of the layout and a result of the image analysis; a step of calculating an evaluation value of each of the plurality of images based on the preference of the user and the image analysis result; and a step of displaying assist information, which is for assisting an editing work of the layout by the user, on the editing screen of the screen display unit based on the evaluation value of each of the plurality of images.

In addition, according to still another aspect of the present invention, there is provided a program causing a computer to execute each step of the layout editing method described above.

In addition, according to still another aspect of the present invention, there is provided a computer-readable recording medium on which a program causing a computer to execute each step of the layout method described above is recorded.

According to the aspects of present invention, the user can easily select a desired unused image from a large number of unused images by assisting the layout editing work of the user based on the preference of the user. Therefore, the editing work can be efficiently performed.

DESCRIPTION OF THE PREFERRED EMBODIMENTS

Hereinafter, a layout editing device, a layout editing method, and a program of the present invention will be described in detail based on preferred embodiments shown in the accompanying drawings.

Figure 1:
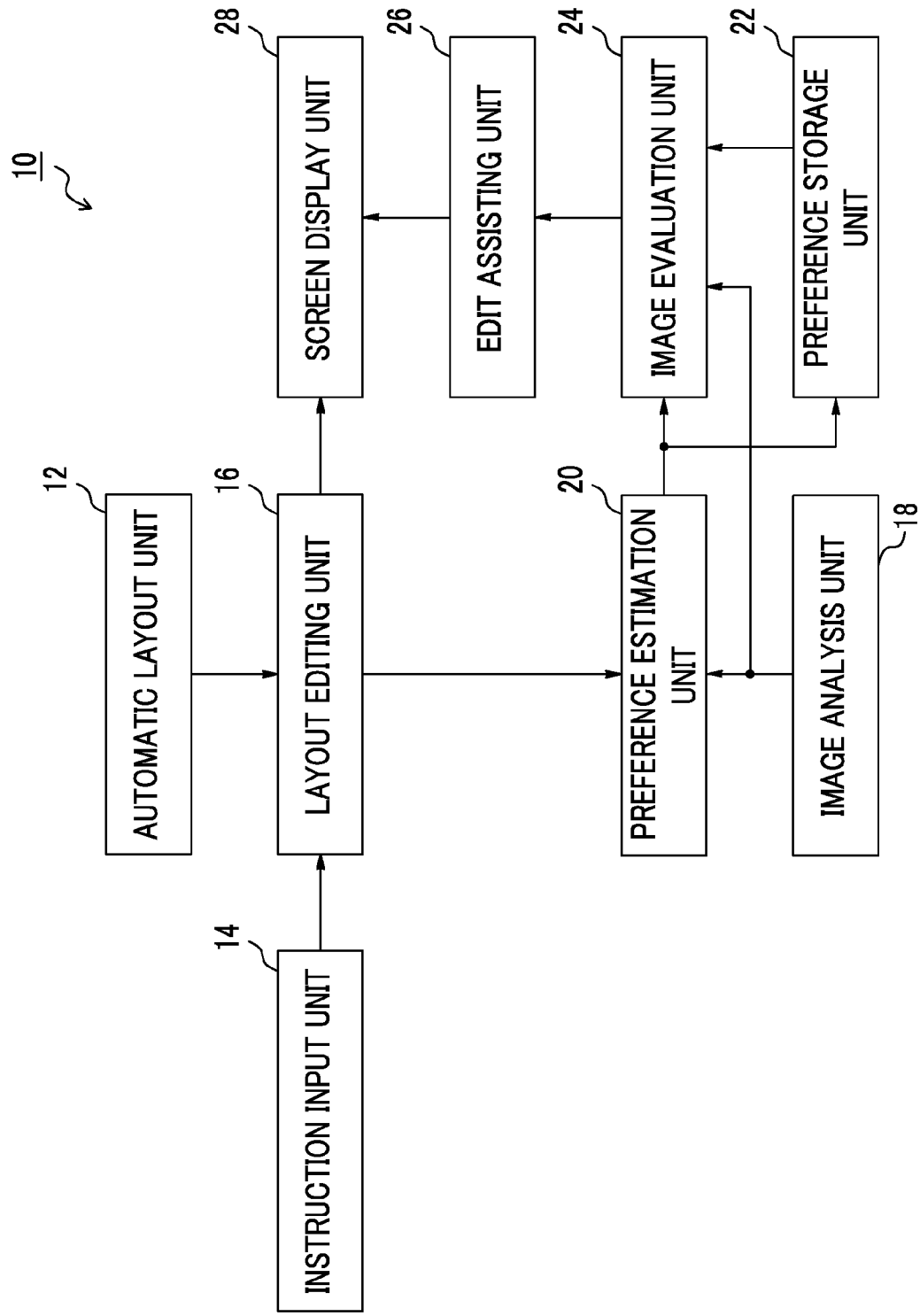
FIG. 1 is a block diagram showing the configuration of a layout editing device according to an embodiment of the present invention.

FIG. 1 is a block diagram showing the configuration of a layout editing device according to an embodiment of the present invention. A layout editing device 10 shown in FIG. 1 edits the layout of each page of a photo book in which a predetermined number of images selected from a plurality of images are disposed at predetermined positions, and is configured to include an automatic layout unit 12, an instruction input unit 14, a layout editing unit 16, an image analysis unit 18, a preference estimation unit 20, a preference storage unit 22, an image evaluation unit 24, an edit assisting unit 26, and a screen display unit 28.

The automatic layout unit 12 creates the layout of each page automatically by selecting a predetermined number of images corresponding to each page from a plurality of images, which can be used in a photo book, and placing the selected images at predetermined positions (automatic layout).

For example, the automatic layout unit 12 divides a plurality of images, which can be used in a photo book, into a predetermined number of groups based on the additional information of image data including photographing time, photographing position, and the like, selects a predetermined number of images from images included in each of the divided groups based on the evaluation value of the image and the like, and places a predetermined number of images selected from each group in one or two or more pages corresponding to each group (automatic layout).

In addition, there is no limitation on the automatic layout method, and the automatic layout unit 12 can perform automatic layout of each page of a photo book using various kinds of automatic layout methods including known automatic layout methods.

The instruction input unit 14 is for inputting the instruction of the user for editing the layout of each page of the photo book and various instructions of the user for operating the layout editing device 10. For example, the instruction input unit 14 is input means, such as a mouse, a keyboard, and a touch panel, and input means capable of inputting the instruction by operating the display screen or the edit screen of the layout displayed on the screen display unit 28 can be used.

When creating a photo book, the user inputs an instruction regarding the number of pages of the photo book, a plurality of images that can be used in the photo book, and the like through the instruction input unit 14. In addition, when editing the layout of a photo book, the user inputs an instruction regarding a page whose layout is to be edited, edited images used in the layout of a page to be edited, designation of unused images that are not used in the photo book among a plurality of images that can be used in the photo book, designation of details of editing, and the like.

The layout editing unit 16 edits the layout of each page of the photo book, which is automatically created by the automatic layout unit 12 and is displayed on the editing screen of the screen display unit 28, based on the instruction of the user input through the instruction input unit 14.

The image analysis unit 18 performs various kinds of image analyses for each of the plurality of images that can be used in a photo book. For example, the image analysis unit 18 checks whether or not there is a face of a person in the image (face recognition). When there is a face of a person in the image, the image analysis unit 18 calculates the size of the face of the person, the position of the face, a face direction, a facial expression, the number of persons included in the image, and the like. In addition, the image analysis unit 18 determines a scene (indoor, outdoor, night view, and the like), the color (brightness, saturation, contrast, and the like) of the entire image, whether each image is a landscape or a portrait, and the like.

In order to check whether or not there is a face of a person in an image, for example, a face detection method using a DWT coefficient obtained by wavelet conversion of an image described in H. Schneiderman et al., "A statistical method for 3d object detection applied to faces and cars" in IEEE Conf. on Computer Vision and Pattern Recognition, 2000, pp. 746-51, which is cited in JP2004-348733A, can be used.

The size of the face can be calculated by using the number of pixels within the face region, the ratio of the face region to the entire image, the ratio of the face region to the width of the image, and the like, for example.

For the position of the face, for example, it is possible to use a value that expresses in percentage the ratio of the coordinate value of the central position (for example, an intersection of diagonals when the face region is a rectangle) of the face region to the length of the image in the horizontal and vertical directions.

The face direction can be calculated using information indicating that the direction of the face included in the face region is a front or a side, for example. In addition, it is also possible to further detect the eyes from the face region and determine the face direction to be the front when two eyes are detected and to be the side when one eye is detected. In addition, it is also possible to calculate the feature amount indicating the face direction from the face region and determine whether the face direction is a front or a side using the feature amount.

For the facial expression, it is determined whether or not the face included in the image is laughing, for example, using the method disclosed in JP2001-43345A. Specifically, a feature vector for identifying an expression based on the pattern of movement of the epidermis is stored in advance for the image of the face having a variety of expressions, a feature vector is calculated from the target image, a distance between the calculated feature vector and the feature vector stored in advance is calculated, and a facial expression corresponding to the feature vector of the shortest distance is determined to be the expression of the face included in the target image.

The number of persons included in an image, a scene, the color of the entire image, whether each image is a landscape or a portrait, and the like can be determined by various kinds of image analyses including known image analyses.

The preference estimation unit 20 estimates the preference (edit intention and edit tendency) of the user based on the layout editing result of the layout editing unit 16 and the image analysis result of the image analysis unit 18.

The preference storage unit 22 stores the data of the user preference estimated by the preference estimation unit 20.

The image evaluation unit 24 calculates the evaluation value of each of a plurality of images, which can be used in a photo book, based on the preference of the user estimated by the preference estimation unit 20 and the image analysis result of the image analysis unit 18. When the data of the user preference is stored in the preference storage unit 22, the image evaluation unit 24 can calculate the evaluation value of each image not from the preference of the user estimated by the preference estimation unit 20 but based on the data of the user preference stored in the preference storage unit 22.

The edit assisting unit 26 displays assist information for assisting the layout editing work of the user on the editing screen of the screen display unit 28 based on the evaluation values of a plurality of images, which can be used in a photo book, calculated by the image evaluation unit 24.

The screen display unit 28 displays various kinds of screens including the display screen of the layout automatically created by the automatic layout unit 12 and the editing screen of the layout edited by the layout editing unit 16.

Figure 2:
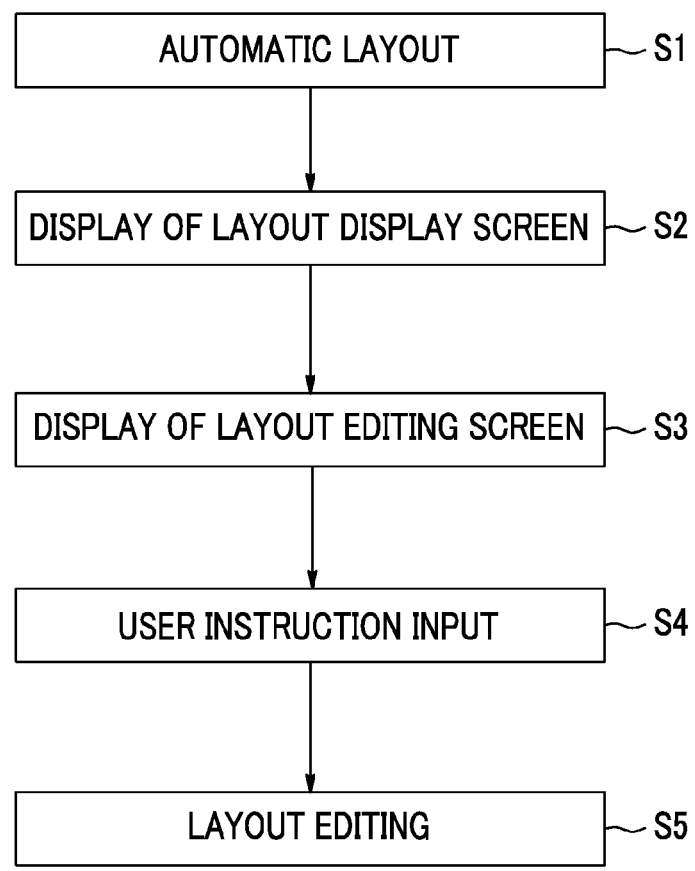
FIG. 2 is a flowchart showing an example of the operation of the layout editing device shown in FIG. 1.

Next, the operation of the layout editing device 10 when the user performs layout editing will be described with reference to the flowchart shown in FIG. 2.

When the user inputs an instruction regarding the photo book creating conditions, for example, an instruction regarding the number of pages of a photo book to be created, an instruction regarding a plurality of images that can be used in a photo book by the designation of the photographing period, and the like through the instruction input unit 14, automatic layout of each page of the photo book is performed by the automatic layout unit 12 (step S1). After the end of the automatic layout, for example, as shown in FIG. 3, the layout of the facing pages 1 and 2 of the photo book created by the automatic layout unit 12 is displayed on the screen display unit 28 as an initial screen of the layout display screen (step S2).

Figure 3:
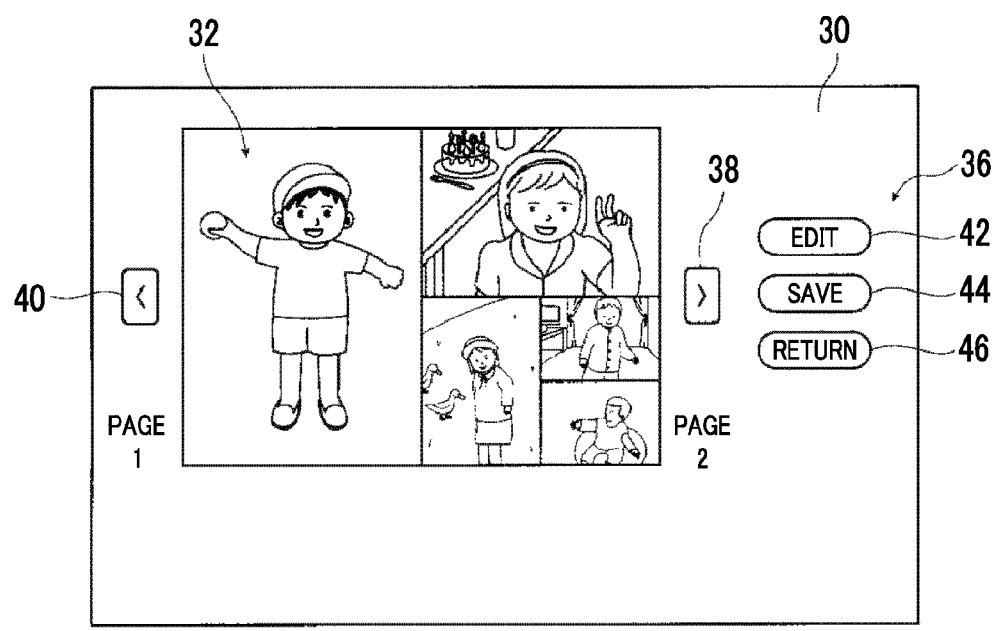
FIG. 3 is a conceptual diagram showing an example of the display screen of the layout of a photo book.

FIG. 3 is a conceptual diagram showing an example of the display screen of the layout of a photo book. A layout display screen 30 shown in FIG. 3 is configured to include a layout display area 32 and an instruction input area 36.

The layout of each page of the photo book created automatically is displayed on the layout display area 32. In FIG. 3, a predetermined number of images used in the layout of the facing pages 1 and 2 are displayed as an initial screen of the layout display screen 30.

Various buttons used when the user inputs various instructions through the instruction input unit 14 are disposed in the instruction input area 36. For example, when the user selects a Right button 38 by clicking it with a mouse or touching it on the touch panel, the layout of the next page is displayed. When a Left button 40 is selected, the layout of the previous page is displayed. In addition, when an "Edit" button 42 is selected, an editing screen of the layout of the page to be edited is displayed. When a "Save" button 44 is selected, data of the current layout is saved. When a "Return" button 46 is selected, an input screen for inputting the photo book creating conditions before automatic layout creation is displayed.

Figure 4:
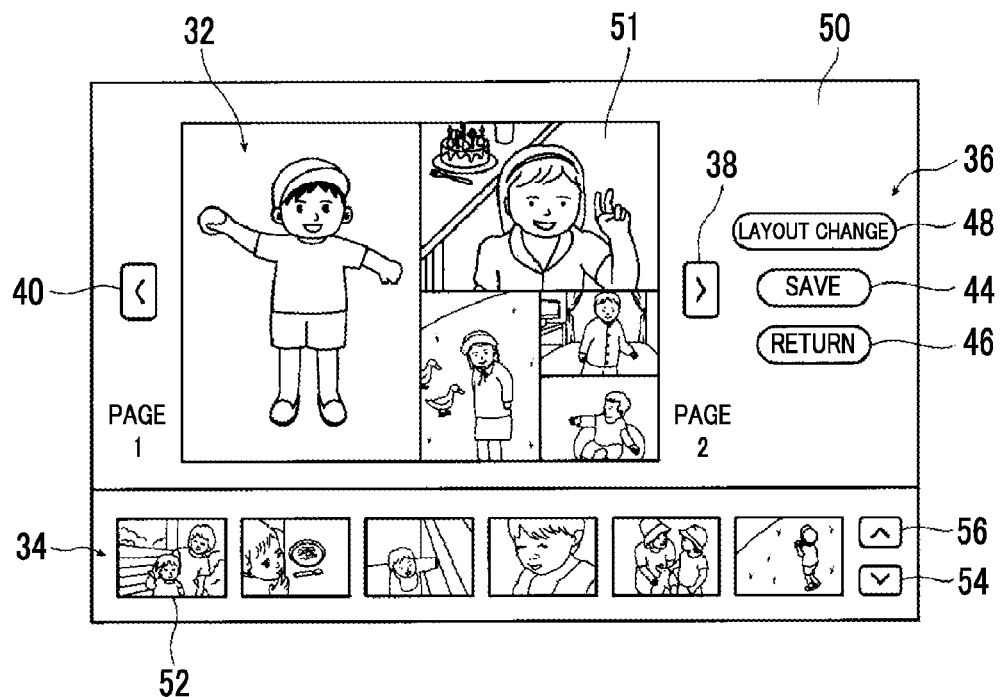
FIG. 4 is a conceptual diagram showing an example of the editing screen of the layout of a photo book.

Then, when the user selects the "Edit" button 42 through the instruction input unit 14 to input a layout editing instruction, an editing screen 50 of the layout of a page to be edited designated by the user is displayed on the screen display unit 28, as shown in FIG. 4 (step S3).

FIG. 4 is a conceptual diagram showing an example of the editing screen of the layout of a photo book. The layout editing screen 50 shown in FIG. 4 is configured to include the layout display area 32, an unused image display area 34, and the instruction input area 36.

The layout of the page to be edited is displayed in the layout display area 32. In FIG. 4, a predetermined number of edited images used in the layout of the facing pages 1 and 2 to be edited are displayed as an initial screen for layout editing.

Thumbnail display of the list of a predetermined number of unused images, among unused images 52 that have not been used in the photo book of the plurality of images that can be used in the photo book, is performed in the unused image display area 34. Although only a predetermined number of unused images 52 are displayed on the editing screen 50, a predetermined number of next unused images are displayed when the user selects a Down button 54, and a predetermined number of previous unused images are displayed when the user selects an Up button 56.

Various buttons used when the user inputs various instructions through the instruction input unit 14 are disposed in the instruction input area 36. The Right button 38, the Left button 40, and the "Save" button 44 are the same as in the case shown in FIG. 3. When a "Layout Change" button 48 is selected, the layout of the page to be edited is changed. When the "Return" button 46 is selected, a screen after automatic layout before layout editing is displayed.

For example, the user can select an image to be edited from an edited image 51 of the layout displayed in the layout display area 32 and rotate and enlarge/reduce the selected edited image, delete the selected edited image from the layout, and replace the selected edited image with an unused image by inputting various instructions through the instruction input unit 14 on the editing screen 50. In addition, the user can select a predetermined unused image from the unused images 52 displayed in the unused image display area 34 and add the selected image to the layout. In addition, the user can change the layout, save the data of the layout, and the like.

When the user inputs various instructions through the instruction input unit 14 (step S4), the layout of the page to be edited is edited by the layout editing unit 16 based on the user instruction input through the instruction input unit 14 (step S5).

Next, the operation of the preference estimation unit 20 will be described.

Figure 5:
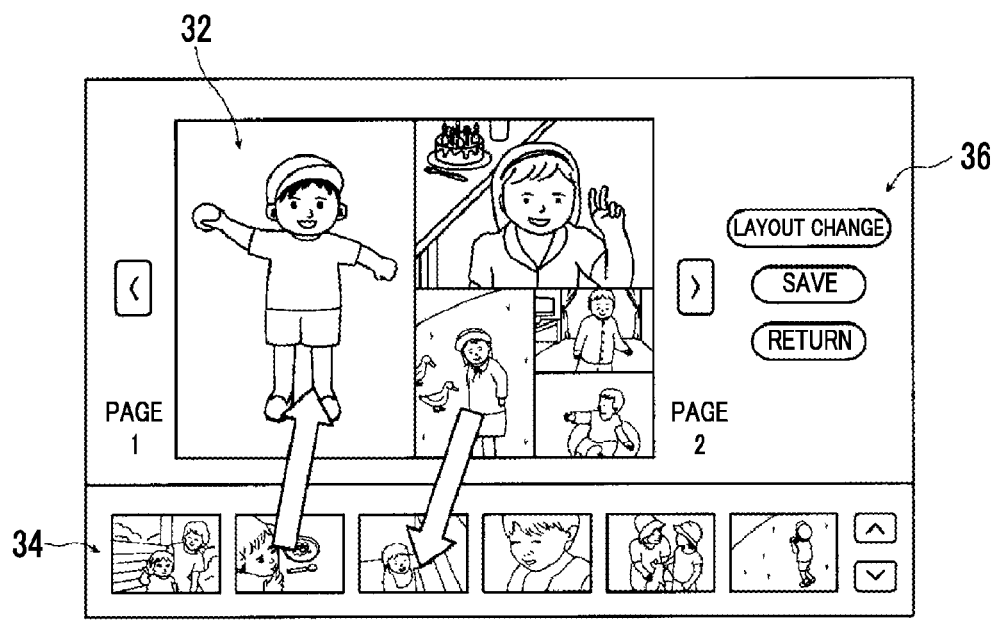
FIG. 5 is a conceptual diagram showing an example when an unused image is added to the layout and an unused image is deleted from an edited image.

First, as indicated by the arrow shown in FIG. 5, an operation when the preference estimation unit 20 estimates the preference of the user based on the unused image (added image), which has been added to the layout from the unused image display area 34 by the user, and the edited image (deleted image), which has been deleted from the layout by the user, will be described.

In this case, the preference estimation unit 20 calculates the importance of each person as the preference of the user based on the layout editing result of the layout editing unit 16, the image analysis result of the image analysis unit 18, and a difference between the number of appearances of each person, who is photographed in one or more added images that have been added to the layout based on the instruction of the user among the unused images, and the number of appearances of the same person as each person, who is photographed in one or more deleted images that have been deleted from the layout based on the instruction of the user.

For example, as shown in Table 1, the number of appearances of each person in added images (the number of additions) is 4 (person A), 10 (person B), 1 (person C), 0 (person D), and 12 (person E), and the number of appearances of each person in deleted images (the number of deletions) is 0 (person A), 2 (person B), 3 (person C), 10 (person D), and 7 (person E). Therefore, (the number of additions–the number of deletions) is 4 (person A), 8 (person B), –2 (person C), –10 (person D), and 5 (person E).

TABLE 1

|  | Person A | Person B | Person C | Person D | Person E | ... |
|---|---|---|---|---|---|---|
| The number of appearances of person in added image (the number of additions) | 4 | 10 | 1 | 0 | 12 | |
| The number of appearances of person in deleted image (the number of deletions) | 0 | 2 | 3 | 10 | 7 | |
| The number of additions – the number of deletions | 4 | 8 | –2 | –10 | 5 | |

In this case, the preference estimation unit 20 determines a person having high (the number of additions—the number of deletions) to be a person of high importance. In the example shown in Table 1, it is determined that the importance of the person B is the highest and the importance becomes low in order of person E, person A, person C, person D, . . . .

Then, the image evaluation unit 24 sets the evaluation value of the image, in which the person B is photographed, to be highest based on the importance of each person and the image analysis result, and then sets the evaluation value of the image, in which each person is photographed, to become low in order of person E, person A, person C, person D, . . . .

Figure 6:
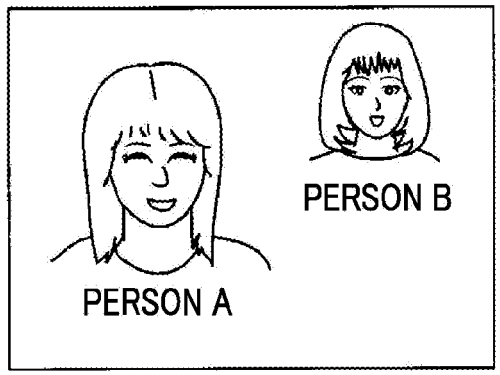
FIG. 6 is a conceptual diagram showing an example of an image in which two persons A and B are photographed.

For example, when the user adds an image, in which two persons A and B are photographed, to the layout as shown in FIG. 6, the preference estimation unit 20 may add the number of appearances (increase the importance) of each of the persons A and B or may weight the number of appearances (importance) to be added according to the size of the face of the person photographed in each added image. In the example shown in FIG. 6, the number of appearances of the person A with a face size larger than the person B is added by +1, and the number of appearances of the person B is added by +0.5. When deleting an image, the number of appearances is similarly subtracted.

In addition, the preference estimation unit 20 may determine the importance of each person, as the preference of the user, based on the number of appearances of each person photographed in edited images used in the photo book (layout) (used images of the photo book).

Table 2 shows the number of appearances of each person in used images of a photo book when the number of additions, the number of deletions, and (the number of additions–the number of deletions) are the same as Table 1. In the example shown in Table 2, the number of appearances of each person in used images of the photo book is 20 (person A), 10 (person B), 8 (person C), 20 (person D), and 8 (person E).

TABLE 2

|  | Person A | Person B | Person C | Person D | Person E | ... |
| --- | --- | --- | --- | --- | --- | --- |
| The number of appearances of person in added image (the number of additions) | 4 | 10 | 1 | 0 | 12 | |
| The number of appearances of person in deleted image (the number of deletions) | 0 | 2 | 3 | 10 | 7 | |
| The number of additions – the number of deletions | 4 | 8 | −2 | −10 | 5 | |
| The number of appearances of person in used image of photo book | 20 | 10 | 8 | 20 | 8 | |

In this case, (the number of additions—the number of deletions) of the person D is −10, but the number of appearances of the person D in the used images of the photo book is 20 that is large. Therefore, the preference estimation unit 20 determines that the importance of the person D is high even though there are many images that the user does not like in terms of a facial expression, a scene, and the like. Similarly, the importance of the person A is also determined to be high. On the other hand, (the number of additions–the number of deletions) of the person B is 8, which is the highest, but the number of appearances of the person B in the used images of the photo book is 10. For this reason, the preference estimation unit 20 determines that the importance of the person B is lower than that of the persons A and D.

In addition, the preference estimation unit 20 may determine the importance of other persons based on the relationship with a person of high importance. For example, the preference estimation unit 20 may calculate the importance based on the importance of each person calculated as described above such that the importance of a person having a large number of appearances in images in which a person of high importance is photographed, among persons photographed in images in which a person of high importance rather than a person of low importance is photographed, is higher than the importance of a person having a small number of appearances. In this case, the preference estimation unit 20 determines that a person photographed in the same image as the person of high importance is a person (related person) having a certain relationship with the person of high importance and the importance of the related person is similarly high.

In addition, the preference estimation unit 20 may calculate the importance based on the importance of each person calculated as described above such that the importance of a person having a large number of appearances in images photographed on the photographing date of an image in which a person of high importance is photographed, among persons photographed in the images photographed on the photographing date of the image in which the person of high importance rather than a person of low importance is photographed, is higher than the importance of a person having a small number of appearances. For example, when the photographing dates of images in which a person of high importance is photographed are March 4, May 4, May 5, and August 18, the preference estimation unit 20 determines that persons having a large number of appearances in all images photographed on all of the photographing dates are related persons and the importance of these related persons is similarly high.

In addition, the preference estimation unit 20 may calculate the importance based on the importance of each person calculated as described above such that the importance of a person having a large number of appearance dates of the photographing dates of images in which a person of high importance is photographed, among persons photographed in images photographed on the photographing dates of images in which a person of high importance rather than a person of low importance is photographed, is higher than the importance of a person having a small number of appearance dates. For example, when the photographing dates of images in which a person of high importance is photographed are March 4, May 4, May 5, and August 18, the preference estimation unit 20 determines that a person having a large number of appearance dates of these photographing dates is a related person of the person of high importance and the importance of the related person is similarly high. For example, the preference estimation unit 20 determines that the importance of a person appearing in the images photographed on March 4 and May 4 is higher than that of a person appearing only in the image photographed on March 4. That is, the preference estimation unit 20 determines that a person having a larger number of appearance dates has a higher importance.

In addition, the preference estimation unit 20 may calculate the importance of each person, as the preference of the user, based on the image content photographed in each of the edited images used in the layout.

Here, the image content is information indicating the state of the contents photographed in the image, and is determined by the image analysis of the image analysis unit 18. There is no limitation on the image content. For example, whether or not a person is photographed in an image, objects (food, toys of a child, and the like) other than a person are photographed, which scene (landscape such as a night view, outdoor, or a sunset) is photographed, and which level of brightness or blurriness an image has can be exemplified.

For example, when a "food" image is used in a predetermined number of layouts, the preference estimation unit 20 determines that "food" is important as the preference of the user, and sets the importance of the "food" image to be higher than the importance of an image in which other things are photographed. In addition, for example, when even a slightly blurred image is not included in the layout, the preference estimation unit 20 determines that "blurriness" is important as the preference of the user, and sets the importance of an image with less blur to be higher than the importance of a blurred image.

Figure 7:
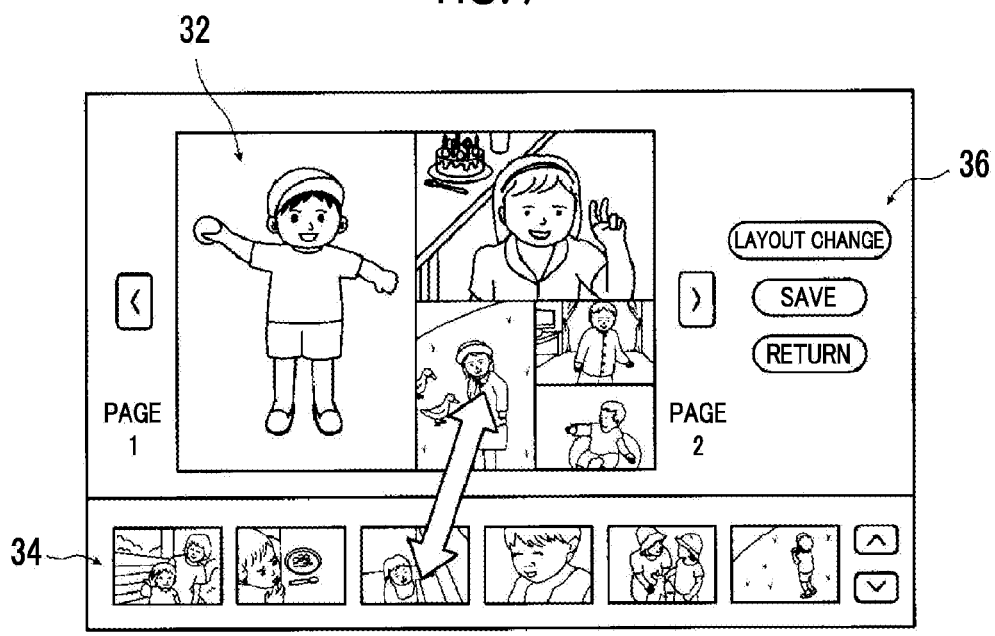
FIG. 7 is a conceptual diagram showing an example when an edited image and an unused image are exchanged with each other.

Subsequently, as indicated by the arrow shown in FIG. 7, an operation when the preference estimation unit 20 estimates the preference of the user based on the images before and after the exchange between the edited image and the unused image will be described.

In this case, as shown in Table 3, the preference estimation unit 20 calculates the importance of persons photographed in images before and after the exchange and the importance of scenes and compositions of the images before and after the exchange, as the preference of the user, based on whether or not a face of a person is photographed in the images before and after the exchange (whether or not a person is photographed), whether or not the same person is photographed in the images before and after the exchange, and whether or not the images before and after the exchange are similar images.

TABLE 3

| No. | Is there face of person? | | Comparison between images before and after exchange | |
|---|---|---|---|---|
| | Before exchange | After exchange | Same person? | Similar? |
| 1 | ○ | ○ | ○ | ○ |
| 2 | ○ | ○ | ○ | X |
| 3 | ○ | ○ | X | ○ |
| 4 | ○ | ○ | X | X |
| 5 | ○ | X | X | ○ |
| 6 | ○ | X | X | X |
| 7 | X | ○ | X | ○ |
| 8 | X | ○ | X | X |

In the case of No. 1, a face of a person is photographed in each of the images before and after the exchange, and the persons are the same person. Therefore, the preference estimation unit 20 determines that the importance of the person photographed in the images before and after the exchange is high. In addition, since the images before and after the exchange are similar images, the user has performed the image exchange because the user did not like the face (expression) of the person photographed in the image before the change. Therefore, since there is no dissatisfaction with the scene or the composition, the preference estimation unit 20 determines that the importance is high.

In the case of No. 2, a face of a person is photographed in each of the images before and after the exchange, and the persons are the same person. Therefore, similar to the case of No. 1, the preference estimation unit 20 determines that the importance of the person photographed in the images before and after the exchange is high. In addition, since the images before and after the exchange are not similar images, the user has performed the image exchange because the user did not like the composition or the scene photographed in the image before the change. Therefore, the preference estimation unit 20 determines that the importance of the scene or the composition in the image before the change is low.

In the case of No. 3, since a face of a person is photographed in each of the images before and after the exchange but the persons are not the same person, the user has performed the image exchange because the user did not like a person photographed in the image before the change. Therefore, the preference estimation unit 20 determines that the importance of the person photographed in the image before the change is low. In addition, since the images before and after the exchange are similar images, the preference estimation unit 20 determines that the importance of the scene or the composition in each of the images before and after the exchange is high as in the case of No. 1.

In the case of No. 4, a face of a person is photographed in each of the images before and after the exchange, but the persons are not the same person. Therefore, similar to the case of No. 3, the preference estimation unit 20 determines that the importance of the person photographed in the image before the change is low. In addition, since the images before and after the exchange are not similar images, the preference estimation unit 20 determines that the importance of the composition or the scene photographed in the image before the change is low as in the case of No. 2.

In the case of No. 5, a face of a person is photographed in the image before the change, but a face of a person is not photographed in the image after the change. Therefore, the preference estimation unit 20 determines that the importance of the person photographed in the image before the change is low. In addition, since the images before and after the exchange are similar images, the preference estimation unit 20 determines that the importance of the scene or the composition in each of the images before and after the exchange is high as in the case of No. 1.

In the case of No. 6, a face of a person is photographed in the image before the change, but a face of a person is not photographed in the image after the change. Therefore, similar to the case of No. 5, the preference estimation unit 20 determines that the importance of the person photographed in the image before the change is low. In addition, since the images before and after the exchange are not similar images, the preference estimation unit 20 determines that the importance of the composition or the scene photographed in the image before the change is low as in the case of No. 2.

In the case of No. 7, a face of a person is not photographed in the image before the change, but a face of a person is photographed in the image after the change. Therefore, the preference estimation unit 20 determines that the importance of the person photographed in the image after the change is high. In addition, since the images before and after the exchange are similar images, the preference estimation unit 20 determines that the importance of the scene or the composition in each of the images before and after the exchange is high as in the case of No. 1.

In the case of No. 8, a face of a person is not photographed in the image before the change, but a face of a person is photographed in the image after the change. Therefore, similar to the case of No. 7, the preference estimation unit 20 determines that the importance of the person photographed in the image after the change is high. In addition, since the images before and after the exchange are not similar images, the preference estimation unit 20 determines that the importance of the composition or the scene photographed in the image before the change is low as in the case of No. 6.

In addition, the preference estimation unit 20 is not limited to the example described above. Using the analysis result of the image analysis unit 18, the preference estimation unit 20 can estimate the preference of the user from the layout editing result, for example, based on the photographing time of the images before and after the exchange, photographing locations of the images before and after the exchange (GPS information), sizes of the faces of persons photographed in the images before and after the exchange, positions of the faces of persons photographed in the images before and after the exchange, directions of the faces of persons photographed in the images before and after the exchange, expressions of persons photographed in the images before and after the exchange, scenes of the images before and after the exchange, colors of the entire images before and after the exchange, and whether the images before and after the exchange are landscapes or portraits, and can calculate the evaluation value of each image, which can be used in a photo book, based on the estimated preference of the user.

For example, the preference estimation unit 20 determines the importance of the scenes photographed in the images before and after the exchange based on whether or not the photographing times of the images before and after the exchange are close to each other (whether or not the photographing times of the images before and after the exchange are within a predetermined time range). For example, when the photographing times of the images before and after the exchange are close to each other, it is determined that the importance of the scenes photographed in the images before and after the exchange is high. On the other hand, when the photographing times of the images before and after the exchange are far from each other, it is determined that the importance of the scene photographed in the image before the change is low.

In addition, the preference estimation unit 20 determines the importance of the photographing locations of the images before and after the exchange based on whether or not the photographing locations of the images before and after the exchange are close to each other (whether or not the photographing locations of the images before and after the exchange are within a predetermined range). For example, when the photographing locations of the images before and after the exchange are close to each other, it is determined that the importance of the photographing locations of the images before and after the exchange is high. On the other hand, when the photographing locations of the images before and after the exchange are far from each other, it is determined that the importance of the photographing location of the image before the change is low.

The user has a preference, such as "a liking for a close-up of a child's face" and "a dislike of too many close-ups of his or her own face", for example. Therefore, based on the sizes and the like of persons and faces photographed in the images before and after the exchange, the preference estimation unit 20 determines the preference of the user for the size of the face.

The user has a preference such as "a liking for a face being located at the center of the screen" and "a liking for a face being slightly shifted from the center of the screen", for example. Therefore, based on the positions of faces photographed in the images before and after the exchange, the preference estimation unit 20 determines the preference of the user for the position of the face.

The user has a preference such as "a liking for a face facing the front" and "a liking for a face being slightly inclined", for example. Therefore, based on the directions of faces photographed in the images before and after the exchange, the preference estimation unit 20 determines the preference of the user for the direction of the face.

The user has a preference, such as "a liking for a child's face that smiles" and "a dislike of his or her own face that smiles", for example. Therefore, based on persons, facial expressions, and the like photographed in the images before and after the exchange, the preference estimation unit 20 determines the preference of the user for the facial expression.

The user has a preference, such as "a liking for an indoor image", "a liking for an outdoor image", and "a liking for a night view", for example. Therefore, based on the scenes of the images before and after the exchange, the preference estimation unit 20 determines the preference of the user for the scene.

The user has a preference, such as "a liking for a light image", and "a liking for an image with high contrast", for example. Therefore, based on the brightness, saturation, contrast, and the like of the images before and after the exchange, the preference estimation unit 20 determines the preference of the user for the color of the entire image.

The user has a preference, such as "a liking for a landscape", and "a liking for a portrait", for example. Therefore, based on persons, landscape, and the like photographed in the images before and after the exchange, the preference estimation unit 20 determines the preference of the user for the portrait/landscape.

In addition, when the user extracts only a region including a predetermined person from an image, in which two or more persons are photographed, of edited images used in the layout and places the extracted region in the layout based on the instruction of the user, the preference estimation unit 20 may calculate the importance such that the importance of the extracted predetermined person is higher than the importance of a person other than the predetermined person of two or more persons photographed in the image.

Figure 8:
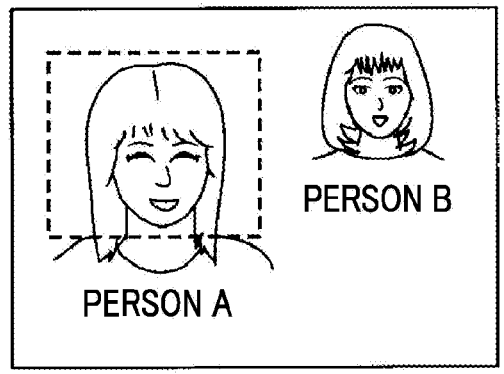
FIG. 8 is a conceptual diagram showing an example when extracting a region including the face of a person A.

For example, as shown by the dotted line in FIG. 8, when a region of the dotted line including the face of the person A, which is extracted from the image in which two persons A and B are photographed, is enlarged and placed in the layout, the preference estimation unit 20 determines that the importance of the person A is higher than that of the person B.

In addition, the preference estimation unit 20 may estimate the preference of the user from the editing result of the layout of a plurality of pages.

When the user performs the same layout editing in all pages, for example, when the user adds an image in which the person A is photographed to all pages, the preference estimation unit 20 gives top priority to the editing result of the layout to estimate the preference of the user and preferentially increases the evaluation value of the image in which the person A is photographed. On the other hand, when the user adds the image in which the person A is photographed in a certain page and deletes the image in which the person A is photographed in another page, the preference estimation unit 20 lowers the evaluation value of the image in which the person A is photographed.

In addition, the preference estimation unit 20 may determine the importance of each page based on the editing time of each page.

For example, it is thought that the user has no hesitation about a page for which layout editing has been completed without spending too much time. For example, when an apparently unrelated person is photographed in an image, the user deletes the image immediately without spending much time. Therefore, the preference estimation unit 20 determines that the importance of the editing result of the layout of the page is high, and increases the priority of the preference of the user estimated from the editing result of the layout of the page.

On the other hand, in the case of a page for which the user has spent time for layout editing, it is thought that the user has made a serious determination. For example, assuming that there are two close friends A and B, even if an image in which the person A is photographed is used in a certain page, an image in which the person B is photographed may need to be used in another page. Therefore, the preference estimation unit 20 determines that the importance of the editing result of the layout of the page is low, and decreases the priority of the preference of the user estimated from the editing result of the layout of the page.

Next, the operation of the edit assisting unit 26 will be described.

The edit assisting unit 26 assists the layout editing work of the user, such as changing the display form of the list of unused images, based on the evaluation values of a plurality of images, which can be used in a photo book, calculated by the image evaluation unit 24.

For example, in the list of unused images thumbnail-displayed in the unused image display area 34, the edit assisting unit 26 preferentially displays an image of high importance for the user, that is, an image having a high evaluation value, and lowers the priority to display an unused image having a low evaluation value. In other words, the edit assisting unit 26 displays an unused image having a high evaluation value in the list of unused images in preference to an unused image having a low evaluation value.

Figure 9:
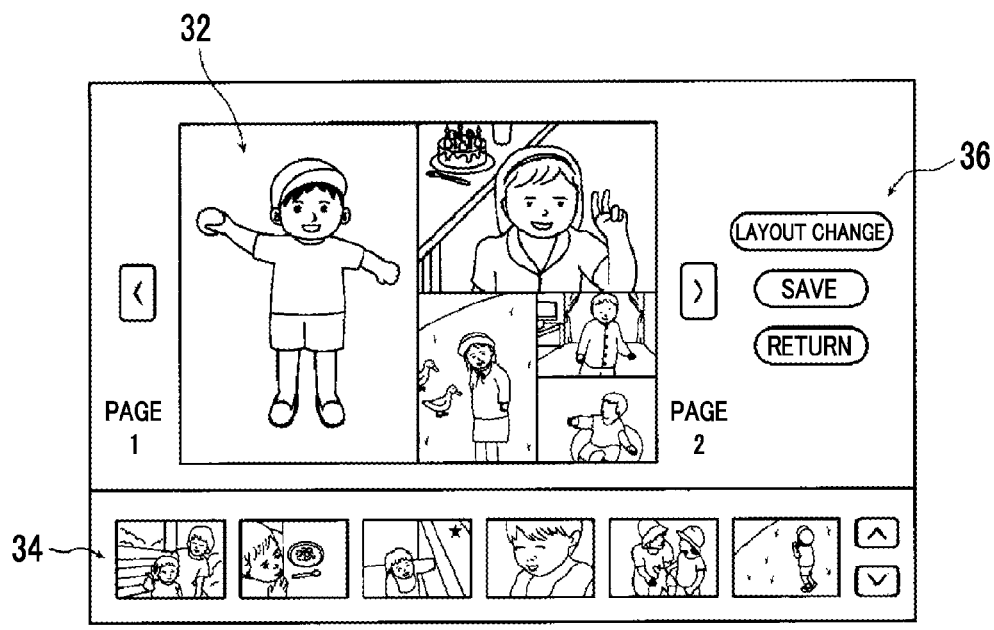
FIG. 9 is a conceptual diagram showing an example of the state in which a "*" mark is put on an unused image having a high evaluation value.

For example, the edit assisting unit 26 places and displays an unused image having a high evaluation value at the head side of the list of unused images in preference to an unused image having a low evaluation value, or displays an unused image having a high evaluation value distinctively in the list of unused images. For example, as shown in FIG. 9, a "*" mark is put on an unused image having a high evaluation value, or the color of the display frame of an unused image having a high evaluation value is changed, or the display size of an unused image having a high evaluation value is changed (display size of an unused image having a high evaluation value is increased). On the contrary, the edit assisting unit 26 moves an unused image having a low evaluation value to the back side of the list of unused images or does not display the unused image having a low evaluation value, for example.

In addition, the edit assisting unit 26 may change an unused image, which is displayed in the list of unused images, according to a predetermined edited image designated based on the instruction of the user among the edited images used in the layout.

Figure 10:
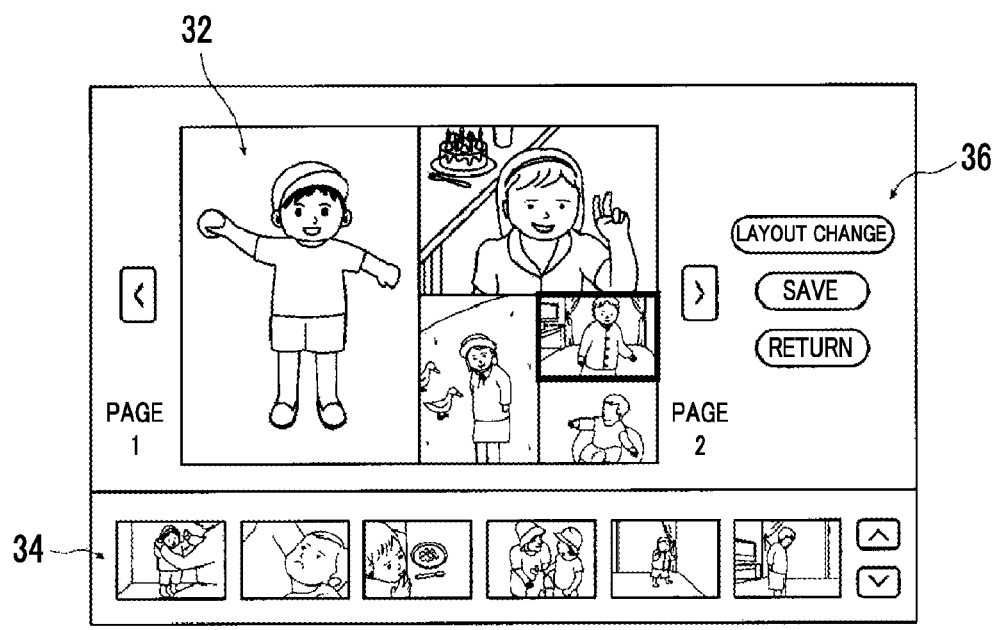
FIG. 10 is a conceptual diagram showing an example of the state in which, when an image in which a person of low importance is photographed is selected, an unused image corresponding to this is displayed in a list of unused images.

For example, when the preference estimation unit 20 calculates as the preference of the user the importance of each person photographed in each of a plurality of images that can be used in a photo book, the edit assisting unit 26 displays an unused image in which a person of high importance is photographed in the list of unused images in precedence to an unused image in which a person of low importance is photographed when an image in which a person of low importance is photographed, among the edited images used in the layout, is selected based on the instruction of the user as shown by the thick frame in FIG. 10. This is the same as when a location is applied instead of a person.

In addition, the edit assisting unit 26 may display the layout created by the automatic layout unit 12, as assist information, on the editing screen of the screen display unit 28 as well as changing the display form of the list of unused images. For example, when the user is editing the layout of a predetermined page of a photo book, the automatic layout unit 12 selects images automatically based on the preference of the user and creates the layout using the selected images. Then, the edit assisting unit 26 displays the layout created by the automatic layout unit 12, as assist information, on the editing screen of the screen display unit 28. In this case, the user can adopt the layout proposed by the edit assisting unit 26 or can further edit the layout under editing with reference to the layout proposed by the edit assisting unit 26.

In addition, the edit assisting unit 26 may display decorative parts, such as a background mount, a frame decoration, clip art, and fonts for text input, on the editing screen of the screen display unit 28, as the assist information, based on the preference of the user. For example, the edit assisting unit 26 displays a background mount for children preferentially when the importance of the "child" is high, or preferentially displays a frame decoration to appeal the image of "food" when the importance of the image of "food" is high. In this manner, the user can decorate the layout under editing by using the decoration parts proposed by the edit assisting unit 26.

Figure 11:
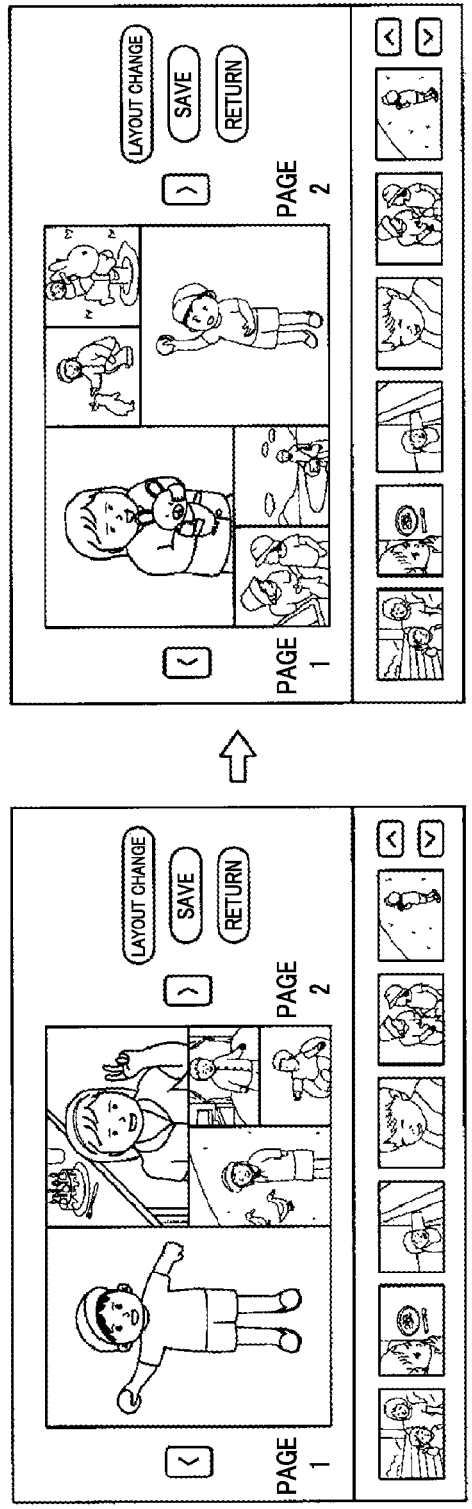
FIG. 11 is a conceptual diagram showing an example of the state in which the layouts of the pages 3 and 4 are changed based on the layout editing result of the pages 1 and 2.

In addition, when the layout editing device 10 edits a layout including a plurality of pages as in the photo book of the present embodiment, the automatic layout unit 12 may create the layout of a page other than a predetermined page of a plurality of pages based on the editing result of the layout of the predetermined page as shown in FIG. 11. For example, when the user adds an image of the person A at the center of the facing pages 1 and 2, the automatic layout unit 12 changes the layout of each page of the facing pages 3 and 4 and subsequent pages to the layout having the person A at the center.

In addition, when the layout editing device 10 edits a layout including a plurality of pages as in the photo book of the present embodiment, the automatic layout unit 20 may estimate the preference of the user based on the layout editing result in two or more of the plurality of pages. Alternatively, the preference estimation unit 20 may estimate the preference of the user based on the layout editing time in each of the plurality of pages.

As described above, the user can easily select a desired unused image from a large number of unused images by assisting the layout editing work of the user based on the preference of the user. Therefore, the editing work can be efficiently performed.

Although the case where the present invention is applied to a photo book including a plurality of pages has been described in the above embodiment, the present invention is not limited to this. A plurality of pages are not necessarily required, and the present invention can also be similarly applied to the layout including one page.

In addition, the layout editing method of the present invention can be realized as a program causing a computer to execute each of the steps. In addition, a computer-readable recording medium on which the program is recorded can also be implemented.

The present invention is basically as described above. While the present invention has been described in detail, the present invention is not limited to the above-described embodiment, and various improvements and modifications may be made without departing from the scope and spirit of the present invention.

What is claimed is:

1. A layout editing device that edits a layout in which a predetermined number of images selected from a plurality of images are disposed at predetermined positions, comprising:
    a screen display unit that displays an editing screen of the layout;
    an instruction input unit that inputs an instruction of a user for editing the layout;
    a layout editing unit that edits the layout, which is displayed on the editing screen of the screen display unit, based on the instruction of the user;
    an image analysis unit that performs image analysis of each of the plurality of images;
    a preference estimation unit that estimates a preference of the user based on an editing result of the layout and a result of the image analysis;
    an image evaluation unit that calculates an evaluation value of each of the plurality of images based on the preference of the user and the image analysis result; and
    an edit assisting unit that displays assist information, which is for assisting an editing work of the layout by the user, on the editing screen of the screen display unit based on the evaluation value of each of the plurality of images, wherein the preference estimation unit calculates importance of each person, as the preference of the user, based on a difference between the number of appearances of each person photographed in one or more added images, which are added to the layout based on the instruction of the user from unused images that have not been used in the layout among the plurality of images, and the number of appearances of the same person as each person photographed in one or more deleted images that have been deleted from the layout based on the instruction of the user.

2. The layout editing device according to claim 1, wherein the preference estimation unit weights the importance according to a size of a face of each person photographed in each of the added image and the deleted image.

3. A layout editing device that edits a layout in which a predetermined number of images selected from a plurality of images are disposed at predetermined positions, comprising:

a screen display unit that displays an editing screen of the layout;

an instruction input unit that inputs an instruction of a user for editing the layout;

a layout editing unit that edits the layout, which is displayed on the editing screen of the screen display unit, based on the instruction of the user;

an image analysis unit that performs image analysis of each of the plurality of images;

a preference estimation unit that estimates a preference of the user based on an editing result of the layout and a result of the image analysis;

an image evaluation unit that calculates an evaluation value of each of the plurality of images based on the preference of the user and the image analysis result; and an edit assisting unit that displays assist information, which is for assisting an editing work of the layout by the user, on the editing screen of the screen display unit based on the evaluation value of each of the plurality of images, wherein the preference estimation unit calculates importance of each person, as the preference of the user, based on the number of appearances of each person photographed in edited images used in the layout, and calculates importance based on the importance of each person such that importance of a person having a large number of appearances in images photographed on a photographing date of an image in which a person of high importance is photographed, among persons photographed in the images photographed on the photographing date of the image in which the person of high importance rather than a person of low importance is photographed, is higher than importance of a person having a small number of appearances in the images photographed on the photographing date of the image in which the person of high importance is photographed.

4. A layout editing device that edits a layout in which a predetermined number of images selected from a plurality of images are disposed at predetermined positions, comprising:

a screen display unit that displays an editing screen of the layout;

an instruction input unit that inputs an instruction of a user for editing the layout;

a layout editing unit that edits the layout, which is displayed on the editing screen of the screen display unit, based on the instruction of the user;

an image analysis unit that performs image analysis of each of the plurality of images;

a preference estimation unit that estimates a preference of the user based on an editing result of the layout and a result of the image analysis;

an image evaluation unit that calculates an evaluation value of each of the plurality of images based on the preference of the user and the image analysis result; and an edit assisting unit that displays assist information, which is for assisting an editing work of the layout by the user, on the editing screen of the screen display unit based on the evaluation value of each of the plurality of images, wherein the preference estimation unit calculates importance of each person, as the preference of the user, based on the number of appearances of each person photographed in edited images used in the layout, and calculates importance based on the importance of each person such that importance of a person having a large number of appearance dates of photographing dates of images in which a person of high importance is photographed, among persons photographed in images photographed on the photographing dates of the images in which the person of high importance rather than a person of low importance is photographed, is higher than importance of a person having a small number of appearance dates.

5. The layout editing device according to claim 1, wherein the screen display unit further displays a list of a predetermined number of unused images, among unused images of the plurality of images that are not disposed in the layout, on the editing screen, and the edit assisting unit displays an unused image having a high evaluation value in preference to an unused image having a low evaluation value, as the assist information, in the list of unused images.

6. The layout editing device according to claim 5, wherein the edit assisting unit places and displays the unused image having the high evaluation value at a head side of the list of unused images in preference to the unused image having the low evaluation value.

7. The layout editing device according to claim 5, wherein the edit assisting unit displays the unused image having the high evaluation value distinctively in the list of unused images.

8. The layout editing device according to claim 7, wherein the edit assisting unit performs the distinctive display in the list of unused images by marking the unused image having the high evaluation value, or by changing a color of a display frame of the unused image having the high evaluation value, or by changing a display size of the unused image having the high evaluation value.

9. The layout editing device according to claim 5, wherein the edit assisting unit changes the predetermined number of unused images according to predetermined images, which are designated based on the instruction of the user among edited images used in the layout, and displays the result in the list of unused images.

10. The layout editing device according to claim 9, when an image in which a person of low importance is photographed, among edited images used in the layout, is designated based on the instruction of the user, the edit assisting unit displays an unused image in which a person of high importance is photographed in the list of unused images in precedence to the image in which the person of low importance is photographed.

11. The layout editing device according to claim 5, further comprising:
an automatic layout unit that creates the layout automatically based on the preference of the user,
wherein the edit assisting unit further displays the layout created by the automatic layout unit, as the assist information, on the editing screen of the screen display unit.

12. The layout editing device according to claim 5,
wherein the edit assisting unit displays at least one of a background mount, a frame decoration, clip art, and fonts for text input on the editing screen of the screen display unit, as the assist information, based on the preference of the user.

13. The layout editing device according to claim 1, further comprising:
an automatic layout unit that creates a layout of each of a plurality of pages automatically,
wherein the automatic layout unit creates a layout of a page other than a predetermined page of the plurality of pages based on an editing result of a layout of the predetermined page.

14. The layout editing device according to claim 1,
wherein the preference estimation unit estimates the preference of the user based on a layout editing result in two or more of a plurality of pages.

15. The layout editing device according to claim 1, further comprising:
a preference storage unit that stores data of the preference of the user,
wherein the image evaluation unit calculates the evaluation value of each of the plurality of images based on the data of the preference of the user stored in the preference storage unit.

16. A layout editing method of editing a layout in which a predetermined number of images selected from a plurality of images are disposed at predetermined positions, comprising:
a step of editing a layout, which is displayed on an editing screen of a screen display unit, based on an instruction of a user for editing the layout that is input through an instruction input unit;
a step of performing image analysis of each of the plurality of images;
a step of estimating a preference of the user based on an editing result of the layout and a result of the image analysis;
a step of calculating an evaluation value of each of the plurality of images based on the preference of the user and the image analysis result; and
a step of displaying assist information, which is for assisting an editing work of the layout by the user, on the editing screen of the screen display unit based on the evaluation value of each of the plurality of images,
wherein the step of estimating the preference of the user calculates importance of each person, as the preference of the user, based on a difference between the number of appearances of each person photographed in one or more added images, which are added to the layout based on the instruction of the user from unused images that have not been used in the layout among the plurality of images, and the number of appearances of the same person as each person photographed in one or more deleted images that have been deleted from the layout based on the instruction of the user.

17. A non-transitory computer-readable recording medium on which a program causing a computer to execute each step of the layout method according to claim 16 is recorded.

18. A layout editing method of editing a layout in which a predetermined number of images selected from a plurality of images are disposed at predetermined positions, comprising:
a step of editing a layout, which is displayed on an editing screen of a screen display unit, based on an instruction of a user for editing the layout that is input through an instruction input unit;
a step of performing image analysis of each of the plurality of images;
a step of estimating a preference of the user based on an editing result of the layout and a result of the image analysis;
a step of calculating an evaluation value of each of the plurality of images based on the preference of the user and the image analysis result; and
a step of displaying assist information, which is for assisting an editing work of the layout by the user, on the editing screen of the screen display unit based on the evaluation value of each of the plurality of images,
wherein in the step of estimating the preference of the user, importance of each person is calculated, as the preference of the user, based on the number of appearances of each person photographed in edited images used in the layout, and importance is calculated based on the importance of each person such that importance of a person having a large number of appearances in images photographed on a photographing date of an image in which a person of high importance is photographed, among persons photographed in the images photographed on the photographing date of the image in which the person of high importance rather than a person of low importance is photographed, is higher than importance of a person having a small number of appearances in the images photographed on the photographing date of the image in which the person of high importance is photographed.

19. A layout editing method of editing a layout in which a predetermined number of images selected from a plurality of images are disposed at predetermined positions, comprising:
a step of editing a layout, which is displayed on an editing screen of a screen display unit, based on an instruction of a user for editing the layout that is input through an instruction input unit;
a step of performing image analysis of each of the plurality of images;
a step of estimating a preference of the user based on an editing result of the layout and a result of the image analysis;
a step of calculating an evaluation value of each of the plurality of images based on the preference of the user and the image analysis result; and
a step of displaying assist information, which is for assisting an editing work of the layout by the user, on the editing screen of the screen display unit based on the evaluation value of each of the plurality of images,
wherein in the step of estimating the preference of the user, importance of each person is calculated, as the preference of the user, based on the number of appearances of each person photographed in edited images used in the layout, and importance is calculated based on the importance of each person such that importance of a person having a large number of appearance dates of photographing dates of images in which a person of high importance is photographed, among persons photographed in images photographed on the photographing dates of the images in which the person of high importance rather than a person of low importance is photographed, is higher than importance of a person having a small number of appearance dates.

* * * * *